United States Patent
Matsuzaki

(10) Patent No.: US 10,363,873 B2
(45) Date of Patent: Jul. 30, 2019

(54) WORK VEHICLE AND IMAGE DISPLAYING METHOD FOR WORK VEHICLE

(71) Applicant: Kubota Corporation, Osaka-shi (JP)

(72) Inventor: Yushi Matsuzaki, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 0 days.

(21) Appl. No.: 15/626,185

(22) Filed: Jun. 19, 2017

(65) Prior Publication Data
US 2018/0170258 A1    Jun. 21, 2018

(30) Foreign Application Priority Data

Dec. 19, 2016   (JP) ................ 2016-245943

(51) Int. Cl.
| | |
|---|---|
| *G09G 5/14* | (2006.01) |
| *B60R 1/00* | (2006.01) |
| *A01B 69/00* | (2006.01) |
| *A01B 76/00* | (2006.01) |
| *G06F 3/0484* | (2013.01) |
| *G06T 11/60* | (2006.01) |
| *H04N 5/247* | (2006.01) |
| *E02F 9/26* | (2006.01) |
| *G06F 3/041* | (2006.01) |

(52) U.S. Cl.
CPC .............. *B60R 1/00* (2013.01); *A01B 69/001* (2013.01); *A01B 76/00* (2013.01); *E02F 9/261* (2013.01); *E02F 9/264* (2013.01); *G06F 3/04845* (2013.01); *G06T 11/60* (2013.01); *H04N 5/247* (2013.01); *B60R 2300/105* (2013.01); *B60R 2300/303* (2013.01); *B60R 2300/607* (2013.01); *G06F 3/041* (2013.01)

(58) Field of Classification Search
CPC .................. G09G 5/14; G09G 2340/125
USPC .............................................. 345/634
See application file for complete search history.

(56) References Cited

U.S. PATENT DOCUMENTS

| | | | |
|---|---|---|---|
| 9,530,086 B1* | 12/2016 | Stratton | G06K 19/06037 |
| 2006/0088190 A1* | 4/2006 | Chinomi | B60R 1/00 |
| | | | 382/104 |

(Continued)

FOREIGN PATENT DOCUMENTS

JP    2015-104375    6/2015

OTHER PUBLICATIONS

Extended European Search Report for corresponding EP Application No. 17000886.6-1006, dated Jan. 25, 2018.

*Primary Examiner* — Jin Ge
(74) *Attorney, Agent, or Firm* — Mori & Ward, LLP

(57) ABSTRACT

A work vehicle includes a vehicle body, cameras, circuitry, and a display. The vehicle body has a peripheral area surrounding the vehicle body and a work equipment attachable to the vehicle body. The peripheral area is divided to allocated areas. The cameras are provided on the vehicle body to capture images of the allocated areas, respectively. The circuitry is configured to convert the images captured by the cameras to partial overhead images via view-point transformation, respectively. The circuitry is configured to composite the partial overhead images based on an image composition pattern that is changeable to produce a peripheral overhead image of the peripheral area. The display is to display the peripheral overhead image.

18 Claims, 4 Drawing Sheets

(56) References Cited

U.S. PATENT DOCUMENTS

| | | | |
|---|---|---|---|
| 2010/0066833 A1* | 3/2010 | Ohshima | B60R 1/00 348/148 |
| 2010/0194886 A1* | 8/2010 | Asari | G06T 7/85 348/148 |
| 2011/0074916 A1 | 3/2011 | Demirdjian | |
| 2013/0147958 A1* | 6/2013 | Mitsuta | B60R 1/00 348/148 |
| 2013/0182066 A1* | 7/2013 | Ishimoto | H04N 7/181 348/38 |
| 2014/0088824 A1* | 3/2014 | Ishimoto | E02F 9/0841 701/34.4 |
| 2014/0375814 A1* | 12/2014 | Ishimoto | B60R 1/00 348/148 |
| 2015/0217691 A1* | 8/2015 | Tanuki | E02F 9/261 348/148 |
| 2016/0200252 A1 | 7/2016 | Oota et al. | |
| 2016/0301864 A1 | 10/2016 | Petrany et al. | |
| 2017/0278425 A1* | 9/2017 | Kozumi | G09B 19/24 |
| 2018/0061007 A1* | 3/2018 | Imano | G06T 3/4038 |
| 2018/0089823 A1* | 3/2018 | Carpenter | G06T 7/0004 |

* cited by examiner

WORK VEHICLE AND IMAGE DISPLAYING METHOD FOR WORK VEHICLE

CROSS-REFERENCE TO RELATED APPLICATIONS

The present application claims priority under 35 U.S.C. § 119 to Japanese Patent Application No. 2016-245943, filed Dec. 19, 2016. The contents of this application are incorporated herein by reference in their entirety.

BACKGROUND OF THE INVENTION

Field of the Invention

The present invention relates to a work vehicle and an image displaying method for a work vehicle.

Discussion of the Background

In a combine according to Japanese Patent Application Laid-open No. 2015-104375 generates, from peripheral images of the vehicle obtained by four cameras, an overhead image that is a pseudo-image viewed from above the vehicle and synthesizes the overhead image with a plan view image of the vehicle stored in a storage unit and an image showing a position of a crawler unit stored in the storage unit, as well as with crawler virtual extensions that are lines extending forward from left and right ends of the crawler unit. The synthesized image is then displayed. When displaying, in case the combine is determined to be traveling forward, the crawler virtual extensions are displayed to be extending forward. In case the combine is determined to be traveling backward, the crawler virtual extensions are displayed to be extending backward.

SUMMARY OF THE INVENTION

According to one aspect of the present invention, a work vehicle includes a vehicle body, cameras, circuitry, and a display. The vehicle body has a peripheral area surrounding the vehicle body and a work equipment attachable to the vehicle body. The peripheral area is divided to allocated areas. The cameras are provided on the vehicle body to capture images of the allocated areas, respectively. The circuitry is configured to convert the images captured by the cameras to partial overhead images via view-point transformation, respectively. The circuitry is configured to composite the partial overhead images based on an image composition pattern that is changeable to produce a peripheral overhead image of the peripheral area. The display is to display the peripheral overhead image.

According to another aspect of the present invention, a work vehicle includes a vehicle body, cameras, conversion means, composition means, and a display. The vehicle body has a peripheral area surrounding the vehicle body and a work equipment attachable to the vehicle body. The peripheral area is divided to allocated areas. The cameras are provided on the vehicle body to capture images of the allocated areas, respectively. The conversion means are for converting the images captured by the cameras to partial overhead images via view-point transformation, respectively. The composition means are for compositing the partial overhead images based on an image composition pattern that is changeable to produce a peripheral overhead image of the peripheral area. The display is to display the peripheral overhead image.

According to further aspect of the present invention, an image displaying method for a work vehicle includes capturing images of allocated areas to which a peripheral area surrounding a vehicle body of the work vehicle and a work equipment attachable to the vehicle body is divided. The images are converted to partial overhead images via viewpoint transformation, respectively. The partial overhead images are composited based on an image composition pattern that is changeable to produce a peripheral overhead image of the peripheral area. The peripheral overhead image is displayed in a display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
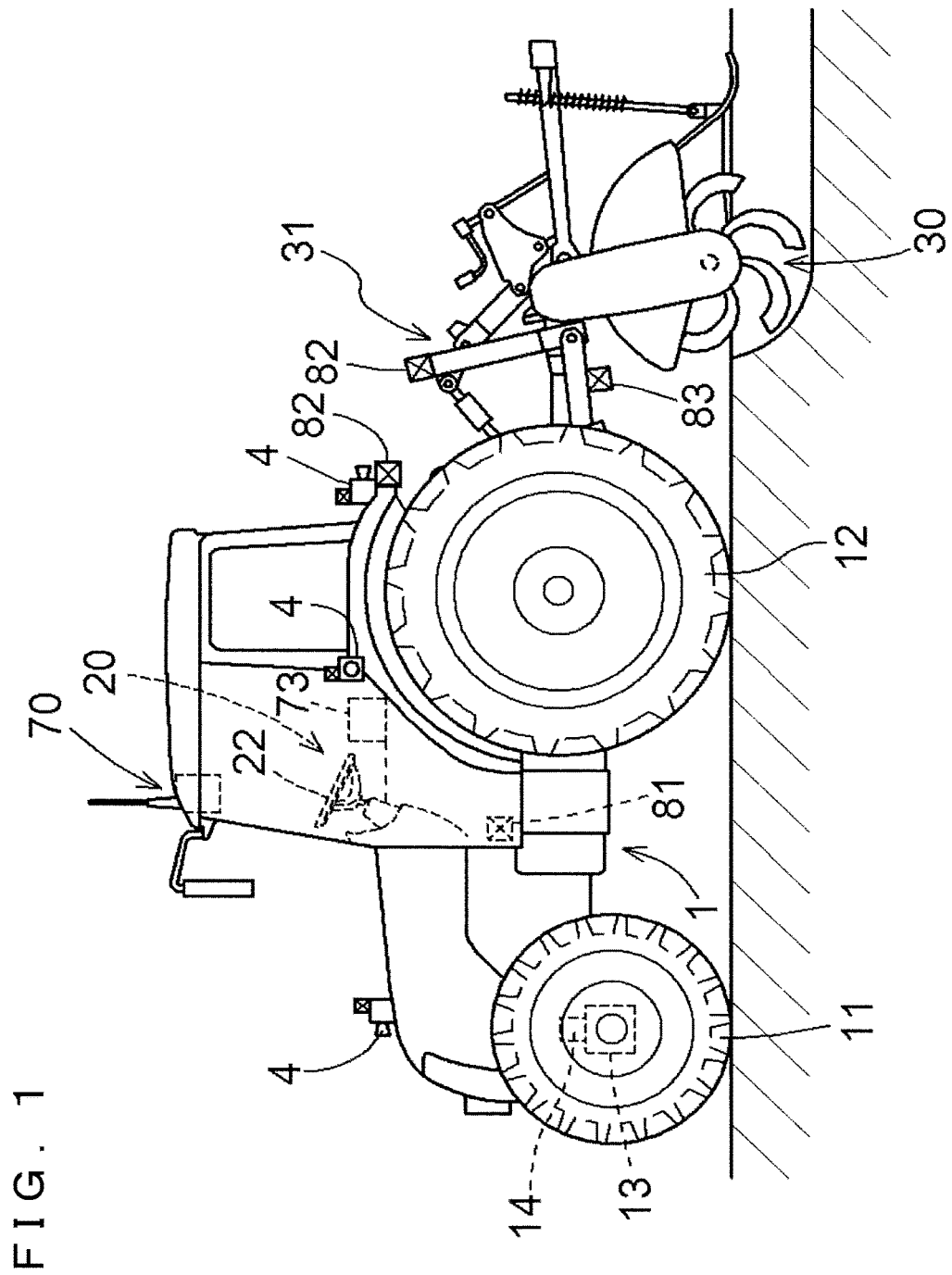
FIG. 1 is a side view of a tractor with tilling equipment attached thereto, which is an example of a work vehicle with work equipment attached thereto.

The embodiments will now be described with reference to the accompanying drawings, wherein like reference numerals designate corresponding or identical elements throughout the various drawings.

Next, a work vehicle according to a specific embodiment of the present invention is described with reference to the drawings. In the present embodiment, the work vehicle is a tractor which performs work using work equipment while traveling through a field (work site). As shown in FIG. 1, the tractor is provided with a steering unit 20 in the center of a vehicle body 1 supported by front wheels 11 and rear wheels 12. Work equipment 30 which is rotary tilling equipment is attached to the rear of the vehicle body 1 via a hydraulic lifting mechanism 31. The front wheels 11 function as the steering control wheels, and the traveling direction of the tractor is changed by changing the steering angle. The steering angle of the front wheels 11 is changed by operating a steering mechanism 13. A steering motor 14 is included in the steering mechanism 13 for automatic steering. During manual operation, the front wheels 11 can be steered by turning the steering wheel 22 arranged inside the steering unit 20. In the steering unit 20, a touch panel 73 (one of display units) is provided, the touch panel 73 having a function of a notification device that provides information to the driver and a function of an input operation device that is operated by the driver.

A satellite positioning module 70 in the form of a global navigation satellite system (GNSS) module is provided in a cabin 21 of the tractor. As a constituent element of the satellite positioning module 70, a satellite antenna is mounted in a ceiling area of the cabin 21 to receive GNSS signals (including GPS signals). The satellite positioning module 70 can also include an inertial navigation module incorporating a gyro acceleration sensor and/or a magnetic direction sensor to complement satellite navigation. The inertial navigation module can of course be provided in a separate location from the satellite positioning module 70.

Four cameras 4 for imaging the periphery of the vehicle body are mounted on the vehicle body 1. The first camera 4 is arranged in the center of a front portion (hood) of the vehicle body, the second camera 4 and the third camera 4 are arranged on left and right sides (rear wheel fenders) of the vehicle body, and the fourth camera 4 is arranged in the center of a rear portion (rear end of the cabin) of the vehicle body. Each camera 4 captures, using an imaging element such as a charge-coupled device (CCD) and/or CMOS image sensor (CIS), two-dimensional images in chronological order at a speed of 15 to 30 frames per second, converts the images to digital images, and outputs the captured images in real time. The imaging optical axis of each camera 4 faces downward so that a part of the vehicle body 1 and/or the work equipment 30 as well as a field surface can be included in the field of view, and a wide-angle lens is attached so that captured images of partial peripheral areas (allocated areas) obtained by the four cameras 4 can cover the entire periphery near the vehicle body.

Further, the tractor is equipped with traveling state detecting sensors 81 for detecting one or more states of the engine, transmission and/or steering mechanism 13 etc., with working state detecting sensors 82 for detecting one or more states such as the orientation and/or position of the lifting mechanism 31 and/or work equipment 30, and with a recognition unit 83 for recognizing a type of the work equipment 30 attached to the vehicle body 1. The working state detecting sensors 82 include usage state detecting sensors for detecting one or more usage states such as orientation, ground clearance, and/or utilized width of the work equipment 30. The recognition unit 83 has a function to mechanically or electronically read an identification code of the work equipment 30 and derive, from the read identification code, one or more work equipment attribute values such as the type and/or size of the work equipment as recognition results.

Figure 2:
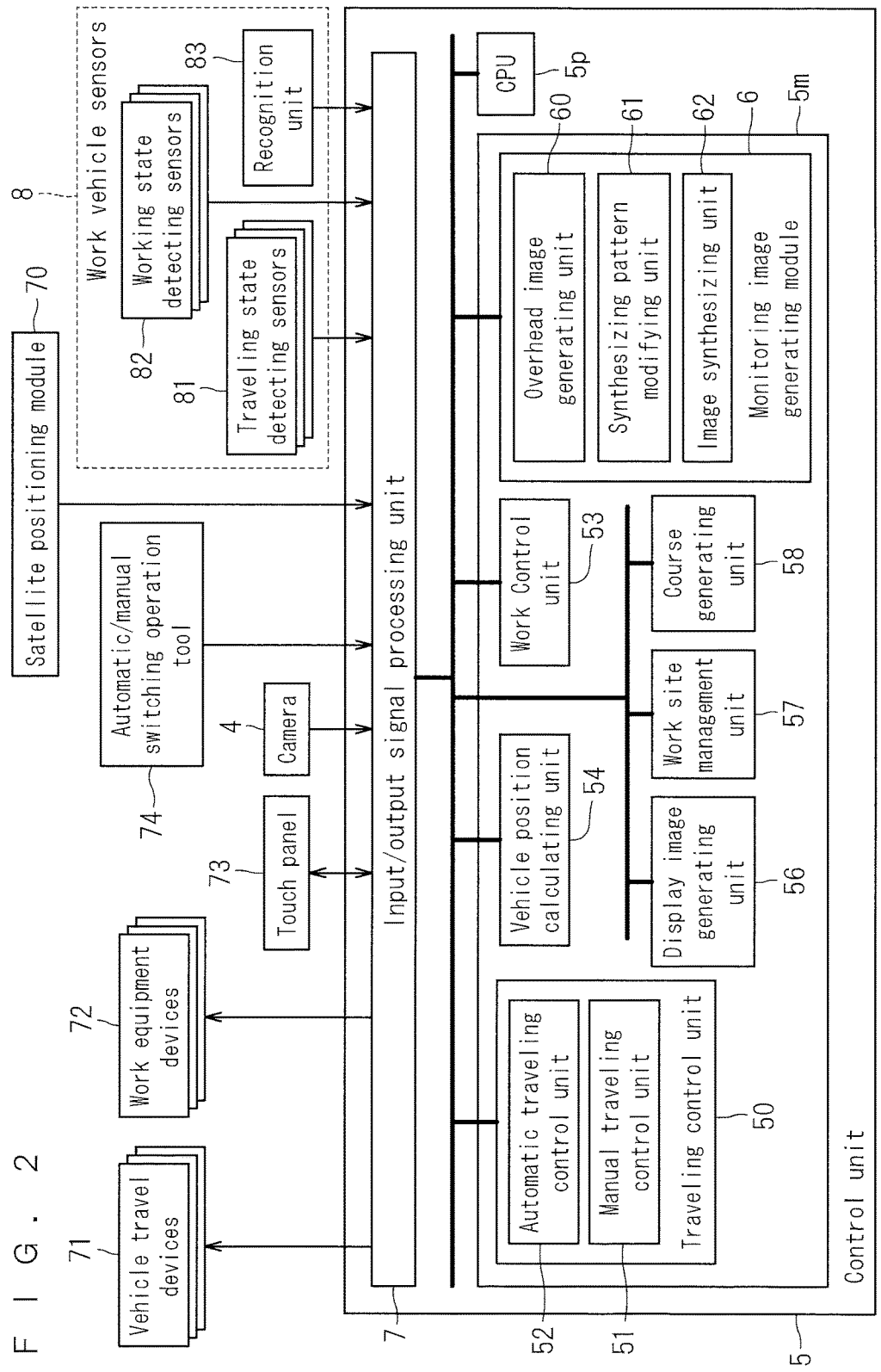
FIG. 2 shows a structure of the tractor (a work vehicle) according to an embodiment of the present invention.

FIG. 2 shows a control system built into the tractor. In the control system, technology is incorporated to display a peripheral overhead image created from captured images of a peripheral area of the work vehicle (the vehicle body 1 and the work equipment 30) captured by the plurality of cameras 4 (four cameras in the present embodiment), on a touch panel 73 serving as the display unit. In a control unit 5 which is the main component of the control system, an input/output signal processing unit 7 is provided, which functions as an input/output interface. Output signal ports of the input/output signal processing unit 7 are connected to vehicle travel devices 71, work equipment devices 72, the touch panel 73, and one or more notification devices such as a lamp and/or speaker used to call attention of the driver and/or observer during operation. The vehicle travel devices 71 include the steering motor 14 and one or more other devices such as a transmission mechanism and/or engine unit which are not shown in the drawing but are controlled for vehicle operation. The work equipment devices 72 include a drive mechanism for the work equipment 30 and/or a lifting mechanism 31 used to raise and lower the work equipment 30, etc.

Input signal ports of the input/output signal processing unit 7 are connected to the above-stated cameras 4, the satellite positioning module 70, work vehicle sensors 8, and an automatic/manual switching operation tool 74. The work vehicle sensors 8 include the traveling state detecting sensors 81 and/or the working state detecting sensors 82, and further include the recognition unit 83 which has the function to read an identification code of the attached work equipment 30. The traveling state detecting sensors 81 include sensors for detecting the traveling state such as the steering angle, the engine speed, and/or the transmission state. The working state detecting sensors 82 include sensors such as sensors for detecting the orientation and/or position of the work equipment 30. The automatic/manual switching operation tool 74 is a switch allowing the user to switch between an automatic traveling mode for traveling with automatic steering and a manual traveling mode for traveling with manual steering. For example, by operating the automatic/manual switching operation tool 74 during the automatic steering mode, the traveling mode is switched to the manual steering mode. Further, for example, by operating the automatic/manual switching operation tool 74 during the manual steering mode, the traveling mode can be switched to the automatic steering mode.

While not shown in the drawings, a communication unit is also connected to the input/output signal processing unit 7. The communication unit exchanges data with one or more external computers via a wireless communication standard and/or a wired communication standard. The one or more external computers include a management computer installed at a remote management center or the like as well as a tablet and/or smartphone (mobile phone) carried by the driver and/or observer.

The control unit 5 includes a central processing unit (CPU) 5p (circuitry 5p) and a memory 5m. Programs of a travel control unit 50, a monitoring image generating module 6, a work control unit 53, a vehicle position calculating unit 54, a display image generating unit 56, a work site management unit 57, and a course generating unit 58 are stored in the memory 5m and executed by the CPU 5p to perform functions of the travel control unit 50, the monitoring image generating module 6, the work control unit 53, the vehicle position calculating unit 54, the display image generating unit 56, the work site management unit 57, and the course generating unit 58, respectively. The traveling control unit 50 that controls the vehicle travel devices 71 includes a manual travel control unit 51 and an automatic travel control unit 52, since the tractor is configured to be operable to travel either in the automatic travel (automatic steering) mode or the manual travel (manual steering) mode. The manual travel control unit 51 controls the vehicle travel devices 71 based on operations performed by the driver. The automatic travel control unit 52 generates one or more automatic steering commands based on deviations between vehicle positions and a travel course, and outputs these commands via the input/output signal processing unit 7 to the steering motor 14. The work control unit 53 outputs one or more control signals to the work equipment devices 72 to control the operation of the work equipment 30.

The traveling control unit 50 performs different control procedures during automatic travel and manual travel. During automatic travel, the traveling control unit 50 achieves a function to compare and evaluate a vehicle position calculated by the vehicle position calculating unit 54 and the travel course generated by the course generating unit 58. When the vehicle position has deviated from the travel course, steering change data is generated and outputted to the automatic travel control unit 52 so that the vehicle body 1 travels along the travel course. The vehicle position calculating unit 54 calculates the vehicle position on the basis of satellite positioning data sent from the satellite positioning module 70. During manual travel, operation travel is performed by operations of the steering wheel 22 and/or the brakes etc. by the driver. At this time, the travel course and the vehicle position can be displayed on the touch panel 73 and/or one or more external displays as travel guidance.

The work site management unit 57 manages field information (work site information) which is information related to the field in which the work is performed. The field information includes data such as a map location, shape, and/or size of the field, as well as a type of crop in the field. The field information can be provided to the work site management unit 57, for example, by downloading from one or more computers installed at a remote management site and/or at a farmer's residence, by downloading from a portable device carried by the driver, and/or by reading from storage medium such as a USB memory.

The course generating unit 58 reads outline data of the field from the field information and generates a travel course suitable for the field. The travel course can be generated automatically based on basic initial parameters inputted by the driver or can be generated by another computer and downloaded. In any case, the travel course obtained by the course generating unit 58 can be developed in the memory and used by the work vehicle, regardless of whether the travel is performed under automatic steering or manual steering, in order for the work vehicle to travel along the travel course.

The control unit 5 includes the monitoring image generating module 6 that generates a peripheral overhead image, as a control function particularly related to the embodiment of the present invention. The monitoring image generating module 6 includes an overhead image generating unit 60, a synthesizing pattern modifying unit 61, and an image synthesizing unit 62. In FIG. 2, the synthesizing pattern modifying unit 61 is incorporated into the monitoring image generating module 6. The monitoring image generating module 6 has basic image processing functions, an overhead image generating function, and an overhead image synthesizing functions. The synthesizing pattern modifying unit 61 is a functional unit that performs adjustments of the synthesizing process, and the synthesizing pattern modifying unit 61 may be configured separately from the monitoring image generating module 6. The overhead image generating unit 60 changes vantage points of the images captured by the four cameras 4 to a vantage point above the center of the vehicle body, and generates a partial overhead image for each camera 4. These partial overhead images have image regions which overlap with each other, and, by synthesizing these partial overhead images to join together, a peripheral overhead image which is an overhead image of the entire periphery of the tractor is generated. These four partial overhead images can be joined together in different ways, and, depending on the manner in which these images are synthesized to join together, an area in the peripheral overhead image occupied by each of the partial overhead images can change. The way in which these images are synthesized to join together is referred to herein as a synthesizing pattern (an image composition pattern). The synthesizing pattern determines the area of the peripheral overhead image occupied by each of the partial overhead images. The proportion of each partial overhead image in the peripheral overhead image can be changed by altering the synthesizing pattern. The image synthesizing unit 62 synthesizes the four partial overhead images based on the synthesizing pattern set by the synthesizing pattern modifying unit 61 and generates a peripheral overhead image. The synthesizing pattern modifying unit 61 may prepare a plurality of synthesizing patterns beforehand, select an appropriate synthesizing pattern from among the plurality of synthesizing patterns and input the selected synthesizing pattern to the image synthesizing unit 62. Alternatively or additionally, the synthesizing pattern modifying unit 61 may adjust one or more existing basic synthesizing patterns to generate an appropriate synthesizing pattern and input the appropriate synthesizing pattern to the image synthesizing unit 62.

Figure 3:
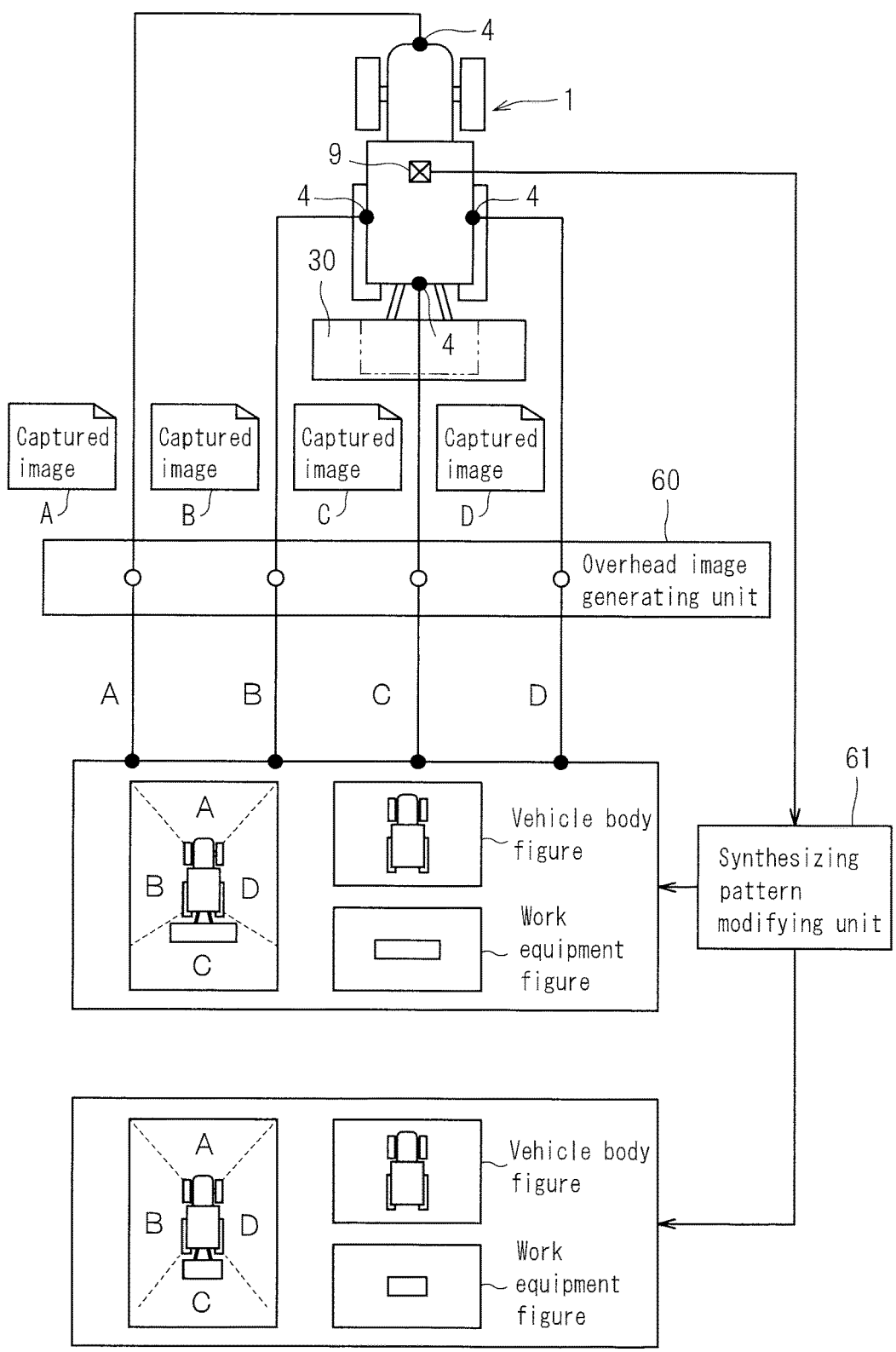
FIG. 3 is an explanatory diagram showing a flow of control to generate a peripheral overhead image, using a synthesizing pattern (an image composition pattern), based on captured images of a peripheral of a vehicle obtained by four cameras in which the controls are generated.

Next, an example of a flow of control for generating a peripheral overhead image from the four partial overhead images using a synthesizing pattern is described with reference to FIG. 3.

Captured images obtained by the four cameras 4 are sent to the overhead image generating unit 60. In FIG. 3, the captured images from each of the cameras 4 are denoted by reference signs A to D in order to distinguish the captured images from each of the cameras 4. The camera 4 for generating the captured image denoted by reference sign C has the peripheral area of the work equipment 30 as its field of view, and is configured to appropriately include the peripheral area of the work equipment 30 in its field of view, with regards to every size of the work equipment 30 that can be attached to the vehicle body 1. The four partial overhead images outputted from the overhead image generating unit 60 are synthesized to join together by the image synthesizing unit 62 to form a peripheral overhead image. In the synthesis process, it is important to use a synthesizing pattern with which a peripheral overhead image can be obtained such that the peripheral overhead image properly encompasses the peripheral area of the work equipment 30 attached to the vehicle body 1.

The image synthesizing unit 62 further applies, in a central portion of the generated peripheral overhead image, a work vehicle figure including a vehicle body figure prepared beforehand and a work equipment figure corresponding to the work equipment 30 attached to the vehicle body. The peripheral overhead image with the work vehicle figure outputted from the image synthesizing unit 62 is sent to the display image generating unit 56, converted to display image signals and sent to the touch panel 73 or one or more external displays.

The following is a list of examples in which the synthesizing pattern is modified by the synthesizing pattern modifying unit 61.

(1) The driver selects, using the touch panel 73, work equipment 30 attached to the vehicle body, and the synthesizing pattern modifying unit 61 selects a synthesizing pattern most suitable for the selected work equipment 30 and sends the selected synthesizing pattern to the image synthesizing unit 62.

(2) The driver selects an optimum peripheral overhead image from among peripheral overhead images displayed in order on the touch panel 73, and the synthesizing pattern modifying unit 61 selects a synthesizing pattern that generates the selected peripheral overhead image and sends the selected synthesizing pattern to the image synthesizing unit 62.

Figure 4:
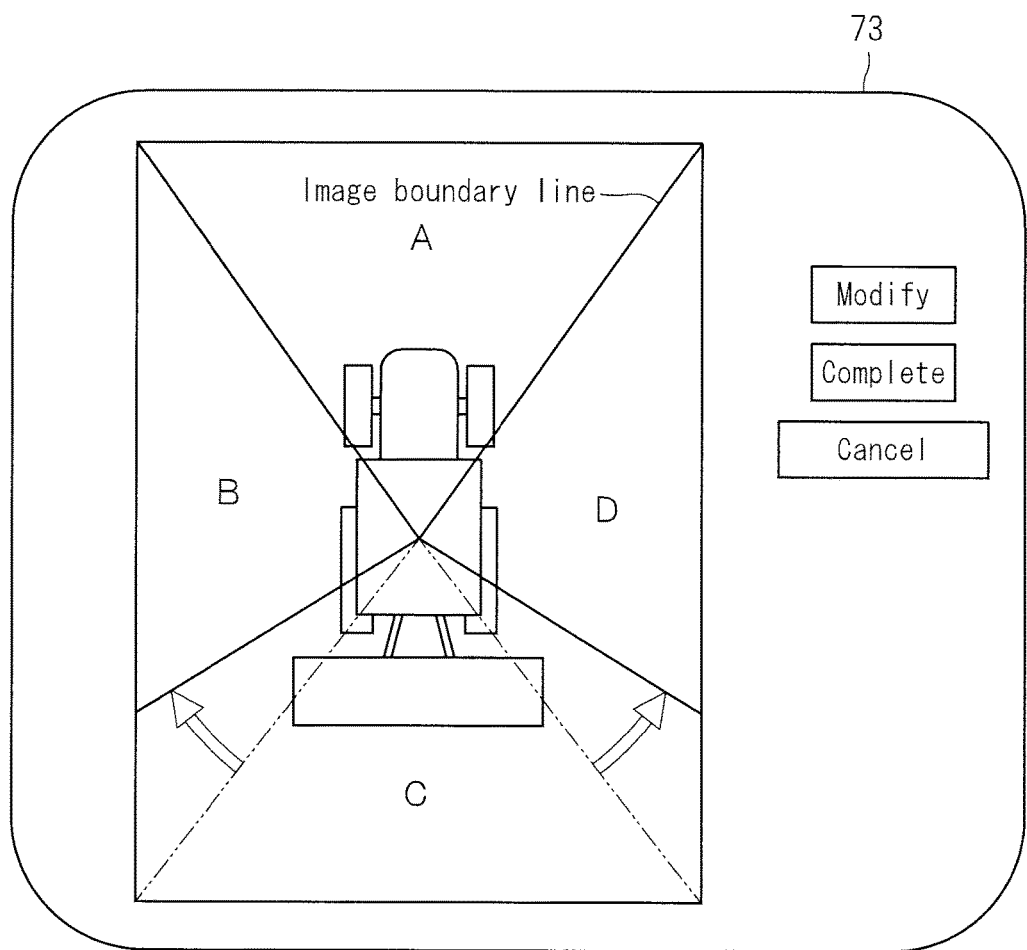
FIG. 4 is a schematic diagram showing modifications to a synthesizing pattern (an image composition pattern) using a touch panel.

(3) FIG. 4 shows modification of a synthesizing pattern in an exemplary case where, in a peripheral overhead image displayed on the touch panel 73, both ends of the work equipment 30 are cut off in an area (denoted by the reference sign C) of the partial overhead image from the camera 4 that has, as its field of view, a peripheral area of the work equipment 30 with a width. By pressing a modify button of the touch panel 73, image boundary lines between the peripheral overhead image and the partial overhead images are displayed. When the driver moves the image boundary lines with a drag-and-drop operation, appropriate proportions of areas occupied by the partial overhead images are adjusted. When a complete button is pressed, the final positions of the image boundary lines are sent to the synthesizing pattern modifying unit 61 as modification commands. The synthesizing pattern modifying unit 61 then provides the image synthesizing unit 62 with a synthesizing pattern based on the positions of the adjusted image boundary lines.

(4) The synthesizing pattern modifying unit 61 selects an optimum synthesizing pattern based on the identification code of the work equipment 30 recognized by the recognition unit 83, and sends the pattern to the image synthesizing unit 62.

(5) When work equipment 30 in which the orientation and/or size thereof changes during the work operation is attached, for example, in case planting equipment of a foldable rice transplanter, tilling equipment and bucket equipment that is raised and lowered, and/or backhoe equipment that is raised, lowered, and rotated, is attached, the synthesizing pattern modifying unit 61 selects an optimum synthesizing pattern based on detection results of sensors (included in the working state detecting sensors 82) that detect changes in the orientation and/or size of the work equipment 30, and sends the selected synthesizing pattern to the image synthesizing unit 62.

One or more of these examples can be used in combination.

Use of a mapping table is an effective way of performing image processing to generate a peripheral overhead image from captured images of a plurality of cameras 4 as stated above. The mapping table is a table that associates pixels in each captured image with pixels in a peripheral overhead image. Further, if a mapping table has been prepared beforehand for each of the synthesizing patterns that are used, a peripheral overhead image can be promptly obtained even when the synthesizing pattern is modified.

OTHER EMBODIMENTS (1) In the embodiment described above, four cameras 4 are used for imaging the periphery of the work vehicle. However, four or more cameras 4 may be used. Further, a combination of one or more camera(s) 4 capturing at least the periphery of the work equipment 30 and one or more cameras 4 capturing something else may be used.

(2) In the embodiment described above, the peripheral overhead image generated by the monitoring image generating module 6 is displayed on a touch panel 73 in the vehicle and/or one or more other displays. However, in case the vehicle is traveling unmanned, the generated peripheral overhead image can be sent using wireless communication to a communication terminal (tablet or smartphone) carried by an observer and/or another work vehicle monitoring the unmanned work vehicle and can be displayed on a display (an example of a display unit) provided thereof. In this case, not only the peripheral overhead image but also the captured images and the partial overhead images may be sent. Further, when a tablet computer and/or management computer that is (are) able to exchange data with the control system of the work vehicle via the input/output signal processing unit 7 is used, a configuration can be adopted where the tablet computer and/or management computer is used for modifying the synthesizing patterns in the manner described above, in addition to displaying a monitoring image such as the peripheral overhead image. In this way, the synthesizing pattern can be modified as necessary to display a desired monitoring image such as a desired peripheral overhead image at a place distant from the work vehicle and a remote management center and/or a farmer's residence.

(3) Each of the functional units in the functional block diagram shown in FIG. 2 is differentiated for explanatory purposes. In reality, each of these functional units may be integrated with one or more other functional units or may be divided into a plurality of functional units. For example, the display image generating unit 56 may be integrated with the monitoring image generating module 6, and/or the synthesizing pattern modifying unit 61 may be separated from the monitoring image generating module 6.

(4) In the embodiment described above, the work vehicle is a tractor attached to work equipment 30 in the form of rotary tilling equipment. However, various other work vehicles may be employed as embodiments, for example, an agricultural vehicle such as a rice transplanter, fertilizer, or combine, or a construction vehicle equipped with a dozer and/or roller etc. as the work equipment 30, or the like.

INDUSTRIAL APPLICABILITY

The embodiment of the present invention can be applied to a work vehicle displaying an overhead image on a monitor using a plurality of cameras.

A work vehicle according to the embodiment of the present invention includes a vehicle body and work equipment attached to the vehicle body. The work vehicle further includes: a plurality of cameras for imaging partial peripheral areas allocated from a peripheral area of the vehicle body and the work equipment; a monitoring image generating module for synthesizing partial overhead images from each camera on the basis of a modifiable synthesizing pattern, thereby generating a peripheral overhead image overlooking the peripheral area, the partial overhead images being generated by changing vantage points of captured images of the partial peripheral areas from each camera; a synthesizing pattern modifying unit for modifying the synthesizing pattern; and a display unit for displaying the peripheral overhead image.

In this configuration, an overhead image conforming to the orientation and/or size of the work equipment attached to the vehicle body can be generated by modifying the synthesizing pattern. In this way, the periphery of the work vehicle including the work equipment can be monitored properly.

In one embodiment of the present invention, the synthesizing pattern is configured so as to specify occupied areas of the partial overhead images in the peripheral overhead image. In this way, when large work equipment is attached to the vehicle body, the occupied area of the partial overhead image including the work equipment can be modified on the basis of the size of the work equipment to ensure the work equipment and its periphery to be included in the partial overhead image. Work can then be preformed while viewing an appropriate peripheral overhead image conforming to the orientation and/or size of the work equipment.

The appropriate proportion of the partial overhead images in the peripheral overhead image varies depending also on user preferences. Therefore, in one embodiment of the present invention, the synthesizing pattern modifying unit modifies the synthesizing pattern on the basis of one or more modification commands received from an input operation device. In this way, an overhead image that is appropriate and easy for a user (such as a driver) to view can be displayed on the display unit.

When modification operation on the synthesizing pattern is performed by the user from a narrow driver's seat or the like, the modification operation environment is desired to be user-friendly. Therefore, in one embodiment of the present invention, the input operation device is a touch panel, and said one or more modification commands are generated by changing positions of image boundary lines between the partial overhead images in the peripheral overhead image displayed on the touch panel. In this configuration, the user can change the image boundary lines displayed on the touch panel by a drag-and-drop operation so that desired modifications can be made to the synthesizing pattern, which results in achieving desired proportions of the partial overhead images in the peripheral overhead image.

It would be convenient if appropriate modifications to the synthesizing pattern were made automatically and not manually by the user in response to the work equipment attached to the vehicle body. In order to achieve this purpose, in one embodiment of the present invention, the work vehicle also includes a recognition unit for recognizing a type of the work equipment, and the synthesizing pattern modifying unit modifies the synthesizing pattern on the basis of one or more recognition results from the recognition unit.

In case of some special work equipment, the size of the work equipment in the overhead image may depend on a state of use. For example, the width of planting equipment in a rice transplanter depends on the number of units being used in the planting equipment. Further, with tilling equipment or bucket equipment or the like attached to a tractor, the size of the equipment and/or positional relationship with respect to the vehicle body in the overhead image depends on a lifting position of the equipment. In case of such work equipment, the synthesizing pattern is preferably changed automatically also during operation. Therefore, in one embodiment of the present invention, the work vehicle also includes a usage state detecting sensor for detecting a usage state of the work equipment, and the synthesizing pattern modifying unit modifies the synthesizing pattern on the basis of one or more detection results from the usage state detecting sensor.

The work vehicle is displayed schematically in the center of the peripheral overhead image displayed on the display unit. In this case, it is desirable that, from the work equipment that is displayed, the work equipment actually attached to the vehicle body can be visually recognized as realistically as possible and at least the size of the work equipment can be recognized. Therefore, in one embodiment of the present invention, a work vehicle figure is provided in a center of the peripheral overhead image, the work vehicle figure includes a vehicle body figure showing the vehicle body and a work equipment figure showing the work equipment, and a size of the work equipment figure is modified as the synthesizing pattern is modified. In this way, the user can accurately monitor the periphery of the work equipment from the peripheral overhead image displayed on the display unit.

Obviously, numerous modifications and variations of the present invention are possible in light of the above teachings. It is therefore to be understood that within the scope of the appended claims, the invention may be practiced otherwise than as specifically described herein.

What is claimed is:

1. A work vehicle comprising:
   a vehicle body having a peripheral area surrounding the vehicle body and selected work equipment attachable to the vehicle body, the peripheral area being divided to allocated areas, the selected work equipment being alternatively selected from a plurality of work equipment;
   cameras provided on the vehicle body to capture images of the allocated areas, respectively;
   a work equipment type input interface via which a type of the selected work equipment is to be input;
   circuitry configured to
      convert the images captured by the cameras to partial overhead images via view-point transformation, respectively,
      composite the partial overhead images based on an image composition pattern to produce a peripheral overhead image of the peripheral area, the image composition pattern being generated according to the selected work equipment, and
      change the image composition pattern based on the type of the selected work equipment; and
   a display to display the peripheral overhead image.

2. The work vehicle according to claim 1, wherein the image composition pattern specifies occupied areas of the partial overhead images in the peripheral overhead image.

3. The work vehicle according to claim 1, wherein the circuitry is further configured to change the image composition pattern based on a change command received from an input operation device.

4. The work vehicle according to claim 3, wherein the input operation device comprises a touch panel, and is configured to generate a change command based on a position change of an image boundary line between the partial overhead images in the peripheral overhead image displayed on the touch panel.

5. The work vehicle according to claim 1, further comprising:
   a work equipment state detecting sensor to detect a state of the selected work equipment,
   wherein the circuitry is configured to change the image composition pattern based on the state of the selected work equipment.

6. The work vehicle according to claim 1, wherein a work vehicle figure is provided in a center of the peripheral overhead image, the work vehicle figure including a vehicle body figure illustrating the vehicle body and a work equipment figure illustrating the selected work equipment, and wherein a size of the selected work equipment figure is changed based on a type of the selected work equipment.

7. The work vehicle according to claim 1,
   wherein the work vehicle is configured to change, with respect to the vehicle body, a position and an orientation of the selected work equipment.

8. The work vehicle according to claim 7, further comprising:
   a work equipment state detecting sensor to detect a state of the selected work equipment, the state of the selected work equipment including a position or an orientation of the selected work equipment with respect to the vehicle body, and
   wherein the circuitry is configured to change the image composition pattern based on the state of the selected work equipment.

9. The work vehicle according to claim 1,
   wherein the image composition pattern is generated based on a size of the selected work equipment.

10. The work vehicle according to claim 1,
    wherein the selected work equipment is attachable to a rear of the vehicle body.

11. A work vehicle comprising:
a vehicle body having a peripheral area surrounding the vehicle body and selected work equipment attachable to the vehicle body, the peripheral area being divided to allocated areas, the selected work equipment being alternatively selected from a plurality of work equipment;
cameras provided on the vehicle body to capture images of the allocated areas, respectively;
a work equipment type input interface via which a type of the selected work equipment is to be input;
conversion means for converting the images captured by the cameras to partial overhead images via view-point transformation, respectively;
composition means for compositing the partial overhead images based on an image composition pattern to produce a peripheral overhead image of the peripheral area, the image composition pattern being generated according to the selected work equipment, the image composition pattern being changed based on the type of the selected work equipment; and
a display to display the peripheral overhead image.

12. The work vehicle according to claim 11,
wherein the work vehicle is configured to change, with respect to the vehicle body, a position and an orientation of the selected work equipment.

13. The work vehicle according to claim 12, further comprising:
a work equipment state detecting sensor to detect a state of the selected work equipment, the state of the selected work equipment including a position or an orientation of the selected work equipment with respect to the vehicle body, and
wherein the circuitry is configured to change the image composition pattern based on the state of the selected work equipment.

14. The work vehicle according to claim 11,
wherein the image composition pattern is generated based on a size of the selected work equipment.

15. The work vehicle according to claim 11,
wherein the selected work equipment is attachable to a rear of the vehicle body.

16. An image displaying method for a work vehicle, comprising:
inputting a type of work equipment attached to the work vehicle;
capturing images of allocated areas to which a peripheral area surrounding a vehicle body of the work vehicle and the work equipment is divided;
converting the images to partial overhead images via view-point transformation, respectively;
compositing the partial overhead images based on an image composition pattern that is changeable to produce a peripheral overhead image of the peripheral area;
changing the image composition pattern based on the type of the work equipment; and
displaying the peripheral overhead image in a display.

17. A work vehicle comprising:
a vehicle body having a peripheral area surrounding the vehicle body and work equipment attachable to the vehicle body, the peripheral area being divided to allocated areas;
cameras provided on the vehicle body to capture images of the allocated areas, respectively;
a work equipment type input interface via which a type of the work equipment is to be input;
circuitry configured to
convert the images captured by the cameras to partial overhead images via view-point transformation, respectively, and
composite the partial overhead images based on an image composition pattern that is changeable to produce a peripheral overhead image of the peripheral area, the image composition pattern being changed based on the type of the work equipment; and
a display to display the peripheral overhead image.

18. A work vehicle comprising:
a vehicle body having a peripheral area surrounding the vehicle body and work equipment attachable to the vehicle body, the peripheral area being divided to allocated areas;
cameras provided on the vehicle body to capture images of the allocated areas, respectively;
a work equipment type input interface via which a type of the work equipment is to be input;
conversion means for converting the images captured by the cameras to partial overhead images via view-point transformation, respectively;
composition means for compositing the partial overhead images based on an image composition pattern that is changeable to produce a peripheral overhead image of the peripheral area, the image composition pattern being changed based on the type of the work equipment; and
a display to display the peripheral overhead image.

* * * * *